United States Patent
Lee et al.

(10) Patent No.: US 12,145,481 B2
(45) Date of Patent: Nov. 19, 2024

(54) VEHICLE SEAT ADJUSTMENT DEVICE

(71) Applicants: HYUNDAI MOTOR COMPANY, Seoul (KR); KIA CORPORATION, Seoul (KR); HYUNDAI TRANSYS INC., Seosan-si (KR)

(72) Inventors: Jun Hwan Lee, Seoul (KR); Sang Do Park, Suwon-si (KR); Ho Suk Jung, Hwaseong-si (KR); Hyeok Seung Lee, Seoul (KR); Mu Young Kim, Osan-si (KR); Chan Ho Jung, Gunpo-si (KR); Jun Young Yun, Osan-si (KR); Jun Sik Hwang, Hwaseong-si (KR); Jung Bin Lee, Hwaseong-si (KR); Won Yeong Lee, Hwaseong-si (KR); Cheol Hwan Yoon, Hwaseong-si (KR)

(73) Assignees: Hyundai Motor Company, Seoul (KR); Kia Corporation, Seoul (KR); Hyundai Transys Inc., Seosan-si (KR)

( * ) Notice: Subject to any disclaimer, the term of this patent is extended or adjusted under 35 U.S.C. 154(b) by 293 days.

(21) Appl. No.: 17/970,968

(22) Filed: Oct. 21, 2022

(65) Prior Publication Data
US 2023/0242013 A1  Aug. 3, 2023

(30) Foreign Application Priority Data
Dec. 31, 2021  (KR) ........................ 10-2021-0193698

(51) Int. Cl.
*B60N 2/12* (2006.01)
(52) U.S. Cl.
CPC .................. *B60N 2/123* (2013.01)

(58) Field of Classification Search
CPC ....................................................... B60N 2/123
See application file for complete search history.

(56) References Cited

U.S. PATENT DOCUMENTS

| | | | | |
|---|---|---|---|---|
| 7,857,392 B2 * | 12/2010 | Hayakawa | ............... | B60N 2/12 |
| | | | | 297/378.12 |
| 9,016,787 B2 * | 4/2015 | Romer | ..................... | B60N 2/12 |
| | | | | 297/317 |
| 9,969,302 B2 * | 5/2018 | Higashi | ..................... | B60N 2/12 |
| 10,308,146 B1 * | 6/2019 | Kish | ...................... | B60N 2/045 |
| 11,845,365 B2 * | 12/2023 | Hwang | ................. | B60N 2/943 |
| 2004/0051361 A1 * | 3/2004 | Rausch | ................ | B60N 2/0715 |
| | | | | 297/341 |
| 2012/0228913 A1 * | 9/2012 | Hurst | ................... | B60N 2/3011 |
| | | | | 297/354.12 |

* cited by examiner

*Primary Examiner* — Philip F Gabler
(74) *Attorney, Agent, or Firm* — Morgan, Lewis & Bockius LLP

(57) ABSTRACT

Disclosed is a vehicle seat adjustment device including a seat-cushion-tilting frame disposed on a moving rail, the moving rail being coupled to a fixed rail so as to be movable forwards and backwards, and connected to a seatback frame, a tilting device hingedly coupled to a base bracket on the moving rail and to a rear end of the seat-cushion-tilting frame to perform forward tilting of the seat-cushion-tilting frame, a locking device connected to the tilting device to lock and unlock the tilting device, and a probe rotatably disposed between the seatback frame and the tilting device, the probe including a stopper capable of being inserted into a locking groove formed in the seatback frame. Rotation of the probe is restricted when the stopper is inserted into the locking groove.

17 Claims, 8 Drawing Sheets

VEHICLE SEAT ADJUSTMENT DEVICE

CROSS-REFERENCE TO RELATED APPLICATION

This application claims under 35 U.S.C. § 119 (a) the benefit of priority from Korean Patent Application No. 10-2021-0193698, filed on Dec. 31, 2021, the entire contents of which are incorporated herein by reference.

TECHNICAL FIELD

The present disclosure relates to a vehicle seat adjustment device configured to prevent a walk-in operation of a seat capable of performing the walk-in operation and a folding operation of a seatback thereof from being simultaneously performed.

BACKGROUND ART

Generally, seats installed in the interior of a passenger vehicle include first-row seats (front seats) and second-row seats (rear seats). In the case of a van and a sport utility vehicle, at least a third row of seats is installed therein, in addition to the first-row seats and the second-row seats. Further, the seats may be installed in various arrangements. Among these vehicle seats, the second-row seat and/or the third row-seat are implemented as seats including a walk-in function of securing a space for a passenger to get into and out of the vehicle.

For example, when two or more rows of seats are installed in a two-door vehicle, the existing walk-in function of securing a space through which a passenger reaches the second-row seat and gets into and out of the vehicle may be implemented by two or more operations, such as an operation of reclining a seatback of the first-row seat forwards and an operation of sliding the entire first-row seat forwards. In the case of a four-door vehicle including three or more rows of seats installed therein, the existing walk-in function of securing a space through which a passenger reaches the second-row seat and gets into and out of the vehicle is implemented by two or more operations, such as an operation of reclining a seatback of the second-row seat forwards and an operation of sliding the entire second-row seat forwards.

However, as described above, in order to implement the walk-in function, it is required for a user to manually perform two or more operations, such as the operation of reclining the seatback forwards and the operation of sliding the entire seat forwards. In order to solve the above-mentioned inconvenience, provided is a walk-in mechanism configured to tilt the entire seat including a seat cushion and a seatback forwards at once.

However, when the seatback is folded after the walk-in operation of the seat is performed, or when the walk-in operation is performed in the state in which the seatback is folded, a frame of the seat may be damaged.

The above information disclosed in this Background section is only for enhancement of understanding of the background of the description, and therefore it may contain information that does not form the prior art that is already known in this country to a person of ordinary skill in the art.

SUMMARY

The present description has been made in an effort to solve the above-described problems associated with the prior art, and it is an object of the present description to provide a seat walk-in device configured to prevent a walk-in operation of a seat capable of performing the walk-in operation and a folding operation of a seatback thereof from being simultaneously performed.

Further, it is an object of the present description to provide a seat walk-in device configured to prevent a walk-in operation of a seat and a folding operation of a seatback from being simultaneously performed through a stopper inserted into a locking groove formed in a seatback frame.

In one aspect, the present description provides a vehicle seat adjustment device including a seat-cushion-tilting frame disposed on a moving rail, the moving rail being coupled to a fixed rail so as to be movable forwards and backwards, and connected to a seatback frame, a tilting device hingedly coupled to a base bracket disposed on the moving rail and to a rear end of the seat-cushion-tilting frame to perform forward tilting of the seat-cushion-tilting frame, a locking device connected to the tilting device to lock and unlock the tilting device, and a probe rotatably disposed between the seatback frame and the tilting device, the probe including a stopper capable of being inserted into a locking groove formed in the seatback frame, wherein rotation of the probe is restricted when the stopper is inserted into the locking groove.

In a preferred embodiment, the tilting device may include a rear link configured to connect the base bracket, connected to a rear end of the moving rail, and the rear end of the seat-cushion-tilting frame, and a rear spring mounted in the rear link to provide elastic force to enable the rear link to stand up.

In another preferred embodiment, the locking device may include a detent including a second protrusion coupled to a first protrusion in the rear link and an extension part extending toward the probe, and a cam configured to release a locked state between the detent and the tilting device. The cam may be connected to a cable of an actuator, and may be rotated by operation of pulling the cable.

In still another preferred embodiment, the detent may be rotated by rotation of the cam to release a locked state between the first protrusion and the second protrusion, and the extension part may contact and rotate the probe so that the stopper is inserted into the locking groove.

In yet another preferred embodiment, folding of the seatback frame may be restrict when the stopper is inserted into the locking groove.

In still yet another preferred embodiment, the detent may further include a projection part configured to contact one end of the cam during rotation of the cam. The projection part and the second protrusion may be provided at one end of the detent with respect to an axis around which the detent rotates, and the extension part may be provided at the other end of the detent opposite to the one end thereof with respect to the axis around which the detent rotates.

In a further preferred embodiment, the detent and the cam may be disposed on the seat-cushion-tilting frame.

In another further preferred embodiment, the actuator may rotate the cam in a direction in which the seatback frame is folded toward front of a seat cushion using the cable when a walk-in operation of a seat is performed, and the detent may be rotated in a direction opposite the direction in which the cam is rotated.

In still another further preferred embodiment, the cam may include a first region connected to the cable and a second region configured to contact the detent by rotation of the cam.

In yet another further preferred embodiment, the probe may be rotated in a direction opposite to the direction in which the detent is rotated when the detent is rotated.

In still yet another further preferred embodiment, folding of the seatback frame may be restricted when rotation of the detent is restricted.

In a still further preferred embodiment, the stopper may be caught in the locking groove to restrict the rotation of the probe when a walk-in operation of a seat starts in a state in which the seatback frame is folded, rotation of the detent may be restricted when the rotation of the probe is restricted, and as such, release of the locked state of the tilting device may be restricted, and performance of the walk-in operation of the seat may be restricted when the release of the locked state of the tilting device is restricted.

In a yet still further preferred embodiment, the stopper of the probe may be spaced apart from the locking groove in a locked state of the tilting device.

In a yet preferred embodiment, the locking device may include a connection link connected to the probe and a cam connected to the connection link to release the locked state of the tilting device, and the cam may be connected to a cable of an actuator and may be rotated by operation of pulling the cable.

In a yet further preferred embodiment, one end of the cam may contact the tilting device and the other end of the cam may be connected to the connection link, and the locked state of the tilting device may be released when the cam is rotated and the probe may be rotated in a direction in which the cam rotates by the connection link connected to the cam.

In yet another further preferred embodiment, the stopper may be inserted into the locking groove when the probe is rotated in the direction in which the cam rotates, and folding of the seatback frame may be restricted when the stopper is inserted into the locking groove.

In still yet another further preferred embodiment, the stopper may extend in a radial direction with respect to an axis around which the probe rotates.

Other aspects and preferred embodiments of the description are discussed infra.

It is understood that the terms "vehicle", "vehicular", and other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, vehicles powered by both gasoline and electricity.

The above and other features of the description are discussed infra.

BRIEF DESCRIPTION OF THE DRAWINGS

The above and other features of the present description will now be described in detail with reference to certain exemplary embodiments thereof illustrated in the accompanying drawings which are given hereinbelow by way of illustration only, and thus are not limitative of the present description, and wherein.

It should be understood that the appended drawings are not necessarily to scale, presenting a somewhat simplified representation of various preferred features illustrative of the basic principles of the description. The specific design features of the present description as disclosed herein, including, for example, specific dimensions, orientations, locations, and shapes will be determined in part by the particular intended application and use environment.

In the figures, reference numbers refer to the same or equivalent parts of the present description throughout the several figures of the drawing.

DETAILED DESCRIPTION

Advantages and features of the present description and methods of achieving the same will become apparent with reference to the embodiments described below in detail in conjunction with the accompanying drawings. However, the present description is not limited to the embodiments disclosed below, but may be implemented in various different forms. The embodiments are provided to ensure that the disclosure of the present description is complete, and to completely explain the scope of the description to those skilled in the art to which the present description pertains. The present description is defined only by the scope of the claims. The same reference numerals represent the same components throughout the specification.

Meanwhile, in the present description, terms such as "first" and/or "second" may be used to describe various components, but the components are not limited by the terms in the following description. The terms are used only for the purpose of distinguishing one component from other components.

The detailed description is illustrative of the description. Further, the above description indicates preferred embodiments of the present description. The present description may be used in various other combinations, modifications, and environments. That is, the description is intended to cover not only the embodiments, but also various alternatives, modifications, equivalents, and other embodiments that may be included within the spirit and scope of the description as defined by the appended claims and/or within the scope of skill or knowledge in the art. The embodiments herein describe the best mode to implement the technical idea of the present description, and various modifications required in specific application fields and uses of the present description can also be made. Therefore, it will be understood that the present description is not intended to limit the description to those exemplary embodiments. Additionally, the appended claims should be construed as including other embodiments.

Figure 1:
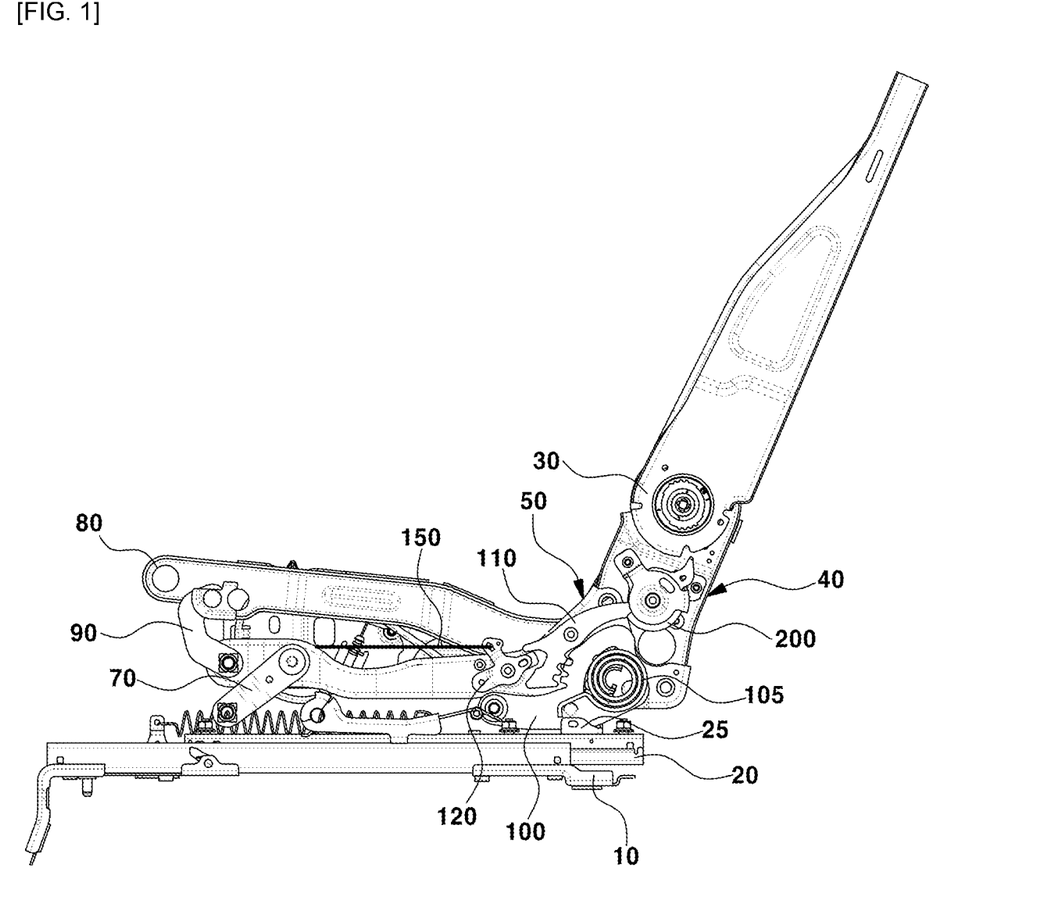
FIG. 1 is a view showing a seat including a vehicle seat adjustment device according to an embodiment of the present description.

FIG. 1 is a view showing a seat including a vehicle seat adjustment device according to an embodiment of the present description.

Referring to FIG. 1, the vehicle seat adjustment device may include a seat-cushion-tilting frame 50, tilting devices 100 and 105, locking devices 110 and 120, and a probe 200. The vehicle seat adjustment device may include components configured to perform a walk-in operation of a seat. The vehicle seat adjustment device may restrict folding (or tilting) of a seatback after the walk-in operation of the seat is performed and may restrict the walk-in operation of the seat after the seatback is folded (or is tilted).

The seat-cushion-tilting frame 50 may be disposed on a moving rail 20. The moving rail 20 is coupled to a fixed rail 10. The locking devices 110 and 120 may be disposed on the seat-cushion-tilting frame 50. Specifically, the locking devices 110 and 120 may be rotatably connected to the seat-cushion-tilting frame 50. The seat-cushion-tilting frame 50 may be connected to a seatback frame 30 via a connection frame 40. The seat-cushion-tilting frame 50 may extend from one end of the connection frame 40 toward the end of a seat cushion. The seat-cushion-tilting frame 50 may be formed to be integrated with the connection frame 40.

The tilting devices 100 and 105 may perform forward tilting of the seat-cushion-tilting frame 50. The entire seat may be tilted toward the front of the seat through forward tilting of the seat-cushion-tilting frame 50. The forward tilting may be an operation in which the front of the seat cushion is lowered and a portion at which the seatback and the seat cushion are connected is lifted. As an example, the tilting devices 100 and 105 may include a rear link 100, connecting a base bracket 25 connected to the rear end of the moving rail 20 and the rear end of the seat-cushion-tilting frame 50, and a rear spring 105, mounted in the rear link 100 to provide elastic force to enable the rear link 100 to stand up. The rear end of the moving rail 20 may be a position adjacent to the seatback in the direction in which the seat is disposed. The rear link 100 may be hingedly coupled to the base bracket 25. The base bracket 25 may be disposed on the moving rail 20, and may also be connected to a front link 70 to be described later. That is, the base bracket 25 may include all of the brackets 25 connected to links disposed on the moving rail 20. The rear spring 105 may provide elastic force to enable the rear link 100 to stand up toward the front of the seat. While the rear link 100 stands up, the seat-cushion-tilting frame 50 may be tilted forwards.

During the walk-in operation of the seat, the locked state of each of the tilting devices 100 and 105 may be released, the rear link 100 may stand up, and the front link 70 may be rotated. The front link 70 may be a link configured to connect the front end of the base bracket 25 and the front end of the seat-cushion-tilting frame 50. When the seatback is folded, a dive link 80, configured to lower the front end of the seat cushion, may connect the seatback frame 30 and a seat cushion frame (not shown). One end of the dive link 80 may be connected to any one of the seat-cushion-tilting frame 50, the connection frame 40, and the seatback frame 30.

The seat cushion frame (not shown) may be connected to the other end of the dive link 80 opposite the one end of the dive link 80. The dive link 80 may be disposed so that a distance between the same and the seat-cushion-tilting frame 50 increases toward the seat cushion from the seatback frame 30. That is, the dive link 80 may be disposed above the seat-cushion-tilting frame 50 as moving from one end of the dive link 80 to the other end thereof. The dive link 80 may have the front end thereof, connected to the seat cushion frame (not shown) while forming a horizontal arrangement, and the rear end thereof, bent upwards to be hingedly coupled to any one of the seat-cushion-tilting frame 50, the connection frame 40, and the seatback frame 30. An arch-shaped dive support link 90, configured to support the dive link 80, may be connected to the front end of the dive link 80 and to the front end of the seat-cushion-tilting frame 50. During the walk-in operation of the seat, the seat cushion frame (not shown) may dive. In this case, the dive support link 90, connecting the front end of the dive link 80 to the front end of the seat-cushion-tilting frame 50, may stably support the dive link 80 while maintaining a constant distance between the dive link 80 and the seat-cushion-tilting frame 50.

The locking devices 110 and 120 may lock and unlock the tilting devices 100 and 105. For example, the locking devices 110 and 120 may include a detent 110 and a cam 120. The cam 120 may be disposed closer to the front end of the seat than the detent 110. The detent 110 and the cam 120 may be rotatably connected to the seat-cushion-tilting frame 50. The detent 110 may be coupled to the rear link 100 to restrict rotation of the rear link 100 so that the detent 110 and the tiling devices 100 and 105 are in the locked state. The cam 120 may release the locked state between the detent 110 and the tilting devices 100 and 105. When a user presses a walk-in switch, an actuator (not shown) may start an operation of pulling a cable 150. When the cable 150 pulls the cam 120, the cam 120 is rotated to rotate the detent 110. As the detent 110 is rotated, coupling between the detent 110 and the rear link 100 may be released. When the coupling between the detent 110 and the rear link 100 is released, the rear link 100 may stand up to start the walk-in operation of the seat.

A probe 200 may be rotatably disposed between the seatback frame 30 and the tilting devices 100 and 105. The probe 200 may be disposed on the connection frame 40. The probe 200 may be disposed closer to the rear end of the seat than the cam 120 and the detent 110. The probe 200 may rotate while remaining in contact with the detent 110. A stopper 205 may be provided at one end of the probe 200. The stopper 205 may extend radially with respect to an axis around which the probe 200 rotates. The stopper 205 may restrict the rotation of the seatback frame 30 through interference with the seatback frame 30, or may restrict the rotation of the detent 110.

Figure 2:
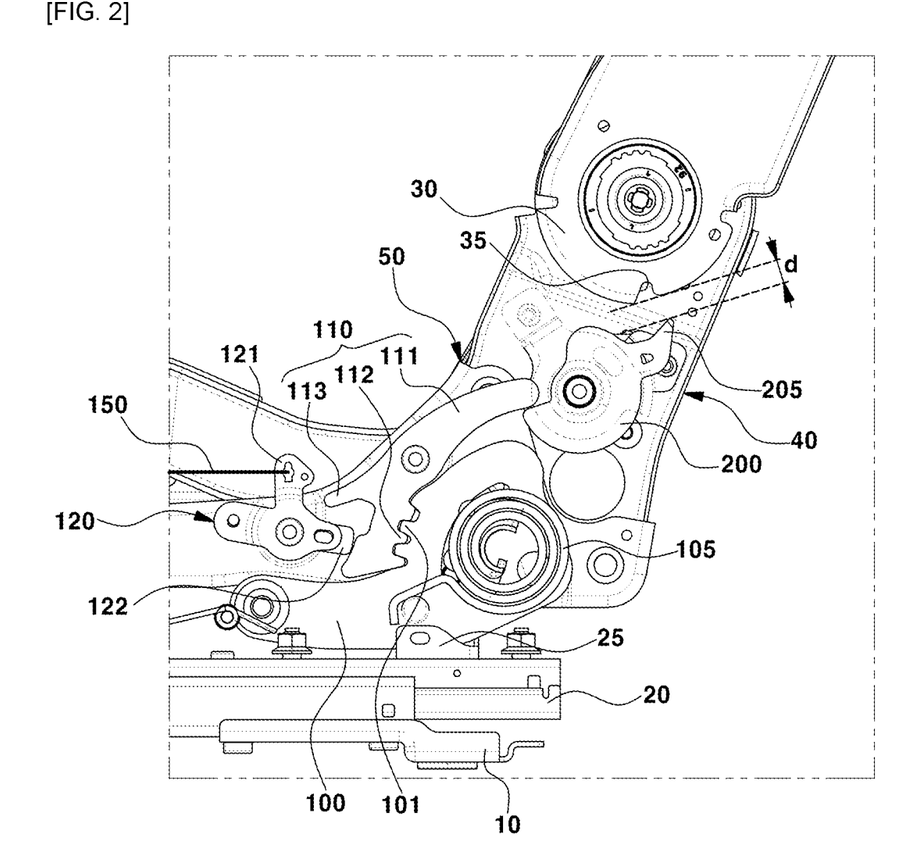
FIG. 2 is a view showing the vehicle seat adjustment device according to the embodiment of the present description before a walk-in operation is performed.

FIG. 2 is a view showing the vehicle seat adjustment device according to the embodiment of the present description before the walk-in operation is performed.

Referring to FIG. 2, the cam 120 may include a first region 121, connected to the cable 150 extending from an actuator (not shown), and a second region 122, contacting the detent 110 when the cam 120 rotates. The detent 110 may include an extension part 111 extending toward the probe 200, a second protrusion 112 coupled to a first protrusion 101 defined in the rear link 100, and a projection part 113 contacting the cam 120 when the cam 120 rotates. The first protrusion 101 of the rear link 100 and the second protrusion 112 of the detent 110 may each have a tooth shape. The detent 110 may be rotatably disposed on the seat-cushion-tilting frame 50. The detent 110 may rotate around an axis connecting the same to the seat-cushion-tilting frame 50. The projection part 113 and the second protrusion 112 may be provided at one end of the detent 110 with respect to the axis around which the detent 110 rotates, and the extension part 111 may be provided at the other end of the detent 110 opposite the one end thereof with respect to the axis around which the detent 110 rotates.

A cover body (not shown), configured to protect the tilting devices 100 and 105 and the locking devices 110 and 120 and to rotatably support the same, may be further mounted on the seat-cushion-tilting frame 50. The first region 121 of the cam 120 and the cover body (not shown) may be connected to each other by a return spring (not shown), and the return spring (not shown) may serve to return the cam 120 to the original position thereof after the cam 120 is pulled by the cable 150.

The second protrusion 112 may be coupled to the first protrusion 101 to restrict the rotation of the rear link 100. That is, when the walk-in operation of the seat is not performed, the second protrusion 112 may be in a state of being coupled to the first protrusion 101. The first protrusion 101 and the second protrusion 112 are coupled to each other so that the rear link 100 and the detent 110 are in the locked state. The extension part 111 may extend toward the probe 200 so as to be in contact with the probe 200. When the walk-in operation of the seat is not performed, the extension part 111 is spaced apart from the probe 200, and as such, the extension part 111 may not rotate the probe 200. Unlike the example described above, when the walk-in operation of the seat is not performed, the extension part 111 may remain in contact with the probe 200, but may be in a state in which the extension part 111 does not apply force to the probe 200. Here, the stopper 205 of the probe 200 may maintain the state of being spaced apart from a locking groove 35 formed in the seatback frame 30 by a predetermined distance d. That is, when the walk-in operation of the seat is not performed, the stopper 205 of the probe 200 may not be inserted into the locking groove 35. The locking groove 35 may be formed at an end of the seatback frame 30, and the end of the seatback frame 30 may be a portion adjacent to the connection frame 40.

Figure 3:
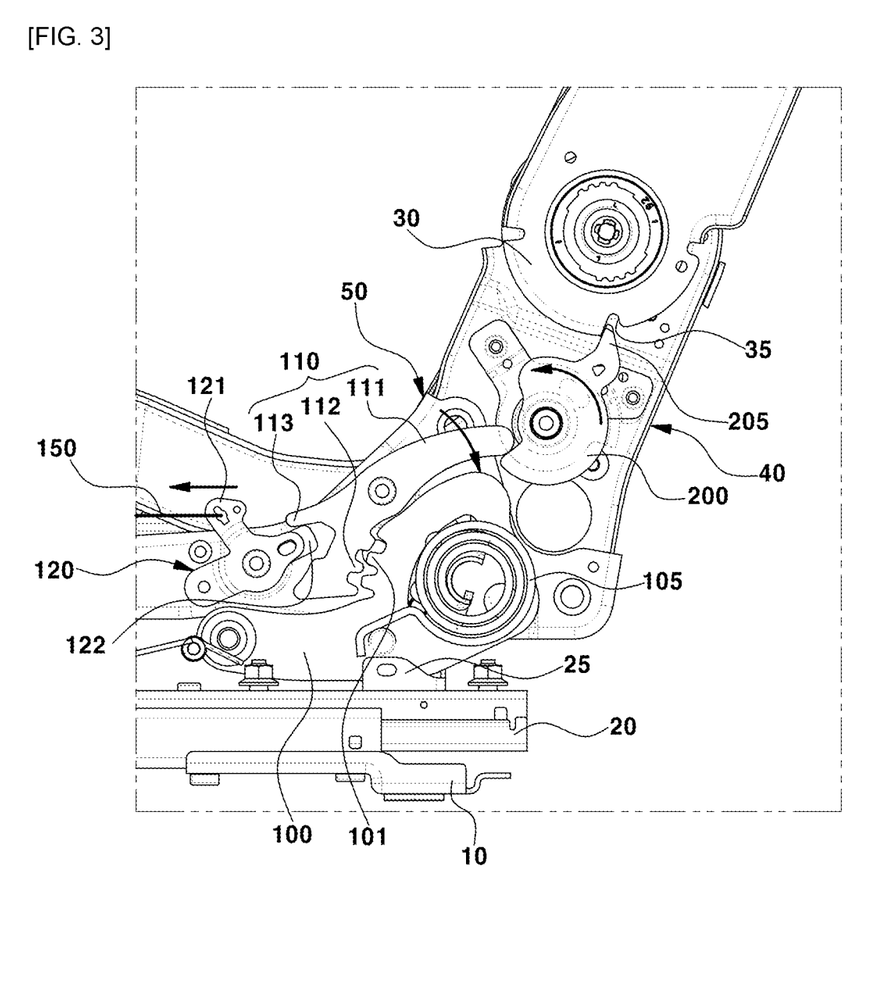
FIG. 3 is a view showing the vehicle seat adjustment device according to the embodiment of the present description after the walk-in operation is performed.

FIG. 3 is a view showing the vehicle seat adjustment device according to the embodiment of the present description after the walk-in operation is performed.

Referring to FIG. 3, the walk-in operation of the seat may be started by rotating the cam 120 using the cable 150. When the cam 120 rotates, the second region 122 of the cam 120 may contact the projection part 113 of the detent 110. The second region 122 of the cam 120 may push the projection part 113 upwards, and the detent 110 may be rotated in the direction opposite the direction in which the cam 120 rotates with respect to the rotation axis. As the detent 110 is rotated, a locked state between the first protrusion 101 and the second protrusion 112 is released and the extension part 111 of the detent 110 may rotate with respect to the rotation axis as indicated by the arrow shown in FIG. 3. Therefore, the extension part 111 of the detent 110 may contact the probe 200 to apply force to the probe 200.

Here, the probe 200 may be rotated in the direction opposite the direction in which the detent 110 rotates as indicated by the arrow shown in FIG. 3. The probe 200 may be rotated in the same direction as the rotation direction of the cam 120, and the probe 200 may be rotated to insert the stopper 205 into the locking groove 35. While the probe 200 is rotated and the stopper 205 is inserted into the locking groove 35, the tilting operation of the seat-cushion-tilting frame 50 may be performed. When the stopper 205 is inserted into the locking groove 35, folding of the seatback frame 30 may be restricted. Specifically, a folding operation in which the seatback frame 30 is folded toward the seat cushion may be restricted by insertion of the stopper 205 into the locking groove 35.

According to the embodiment of the present description, when the walk-in operation of the seat is performed, the stopper 205 may be inserted into the locking groove 35 and the folding of the seatback frame 30 may be restricted. Therefore, the walk-in operation of the seat and the folding operation of the seatback are restricted from being simultaneously performed, thereby making it possible to prevent damage to a frame due to unintended contact between the frames of the seat.

Figure 4:
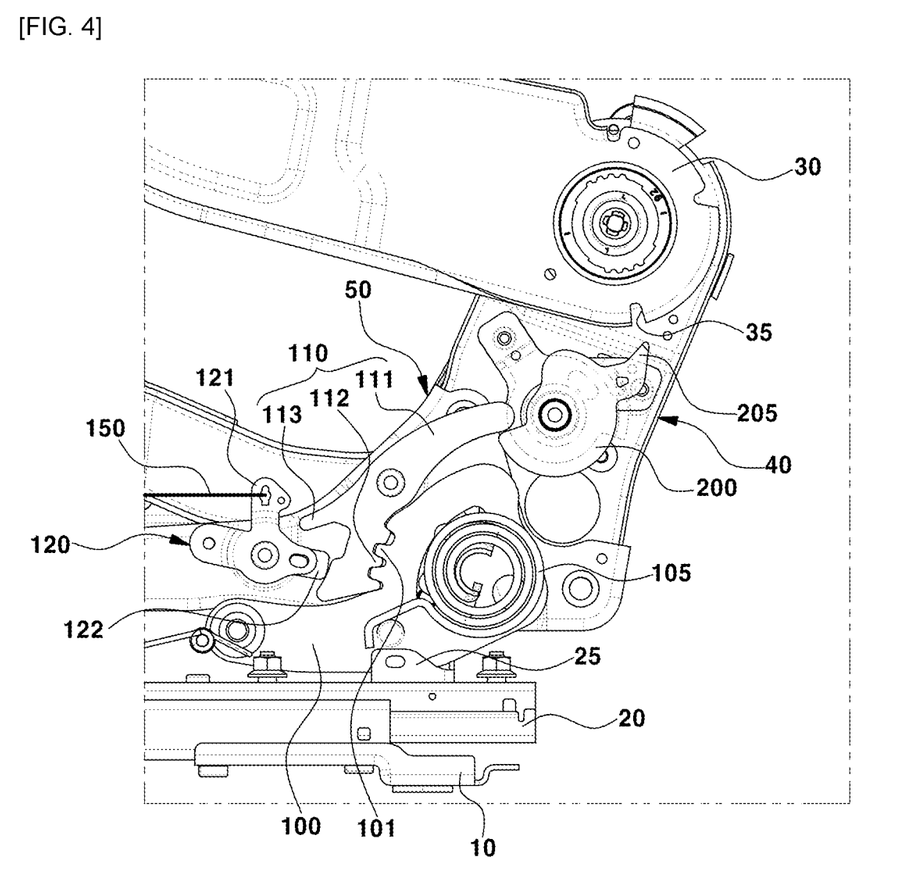
FIG. 4 is a view showing the vehicle seat adjustment device according to the embodiment of the present description before the walk-in operation is performed in the state in which a seatback is folded.
Figure 5:
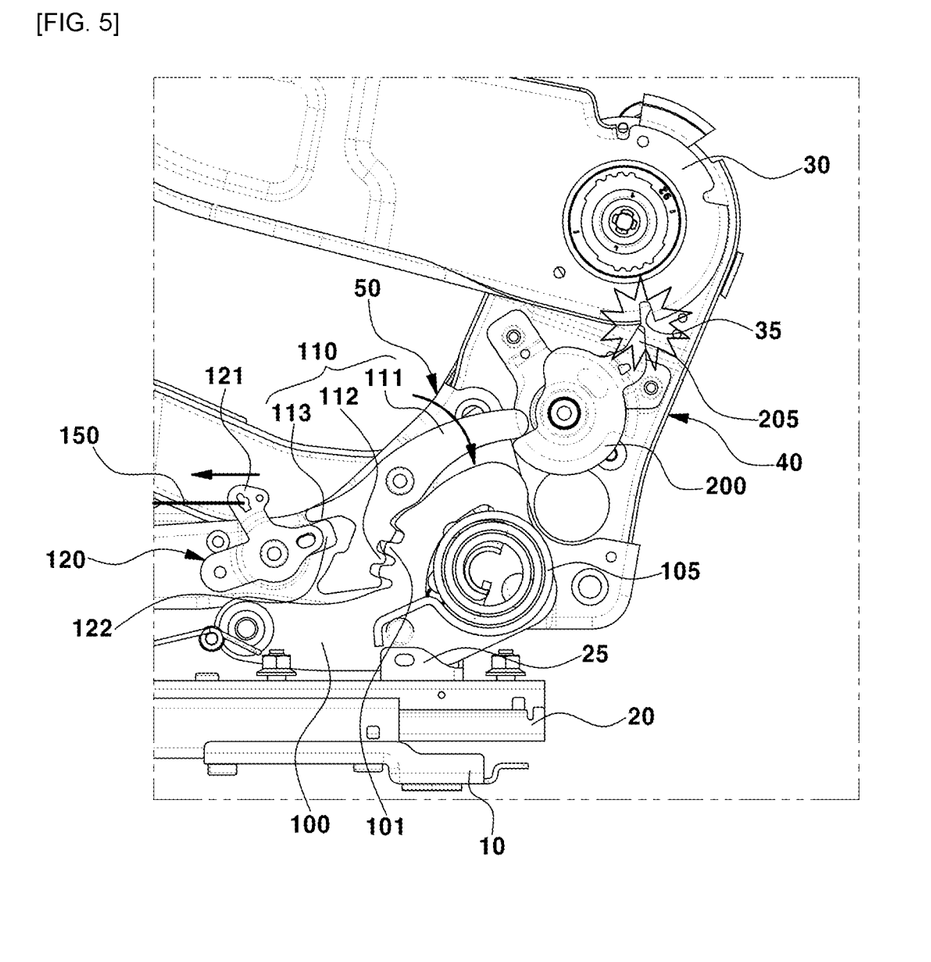
FIG. 5 is a view showing the vehicle seat adjustment device according to the embodiment of the present description after the walk-in operation is performed in the state in which the seatback is folded.

FIG. 4 is a view showing the vehicle seat adjustment device according to the embodiment of the present description before the walk-in operation is performed in the state in which the seatback is folded, and FIG. 5 is a view showing the vehicle seat adjustment device according to the embodiment of the present description after the walk-in operation is performed in the state in which the seatback is folded.

Referring to FIGS. 4 and 5, when the walk-in operation of the seat is not performed in the state in which the seatback frame 30 is folded, the stopper 205 of the probe 200 may not be inserted into the locking groove 35 in the seatback frame 30. That is, the stopper 205 may be spaced a predetermined distance apart from the seatback frame 30. When the walk-in operation of the seat is not performed in the state in which the seatback frame 30 is folded, rotation of the tilting devices 100 and 105 may be restricted by the locking devices 110 and 120. Specifically, the rear link 100 and the detent 110 may be coupled to each other to restrict standing of the rear link 100.

When the walk-in operation of the seat is performed in the state in which the seatback frame is folded, the stopper 205 may be caught in the locking groove 35. Even though the stopper 205 is not completely inserted into the locking groove 35, movement of the stopper 205 may be restricted by the locking groove 35. Accordingly, the probe 200 may not be rotated enough to perform the walk-in operation of the seat. For example, when the movement of the stopper 205 is restricted by the locking groove 35, the rotation of the probe 200 may also be restricted. In the state in which the rotation of the probe 200 is restricted, even though the cam 120 is rotated by the operation of the actuator (not shown), rotation of the detent 110 in contact with the probe 200 may be restricted. For example, rotation of the detent 110 may be limited beyond about 4 degrees. As a result, when rotation of the probe 200 is restricted, rotation of the detent 110 is restricted, and as such, release of the locked state of the tilting devices 100 and 105 may be restricted. Accordingly, even if the user presses the walk-in switch, the walk-in operation may not be performed in the state in which the seatback is folded.

According to the embodiment of the present description, when the walk-in operation of the seat is performed in the state in which the seatback is folded, the stopper 205 is inserted into the locking groove 35, and as such, rotation of the probe 200 may be restricted. When rotation of the probe 200 is restricted, the coupling between the rear link 100 of the tilting devices 100 and 105 and the detent 110 of the locking devices 110 and 120 may not be released. Accordingly, the walk-in operation of the seat and the folding operation of the seatback are restricted from being simultaneously performed, thereby making it possible to prevent damage to a frame due to unintended contact between the frames of the seat.

Figure 6:
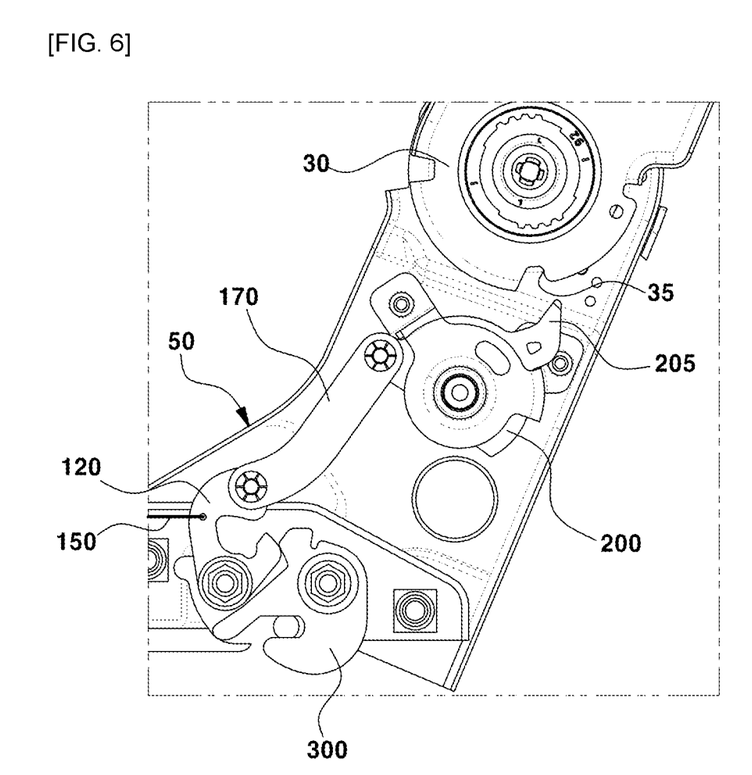
FIG. 6 is a view showing a modification of the vehicle seat adjustment device according to the embodiment of the present description.

FIG. 6 is a view showing a modification of the vehicle seat adjustment device according to the embodiment of the present description.

Referring to FIG. 6, a tilting device 300 configured to tilt the seat-cushion-tilting frame 50 may be a latch. The tilting device 300 may be locked or unlocked by locking devices 150 and 170. The locking devices 150 and 170 may include a cam 120 configured to release the lock of the tilting device 300 and a connection link 170 connected to the probe 200. The connection link 170 may be disposed between the cam 120 and the probe 200. One end of the connection link 170 may be rotatably connected to the cam 120, and the other end of the connection link 170 may be rotatably connected to the probe 200.

When the walk-in operation of the seat is not performed, the cam 120 may maintain a state of being in contact with the tilting device 300. One end of the cam 120 may be in contact with the tilting device 300, and the other end of the cam 120 may be connected to the connection link 170. In the state in which the cam 120 and the tilting device 300 contact each other, the tilting device 300 may not be able to tilt the seat-cushion-tilting frame 50. The stopper 205 of the probe 200 may not be inserted into the locking groove 35, and the stopper 205 may be spaced apart from the seatback frame 30 by a predetermined distance.

Figure 7:
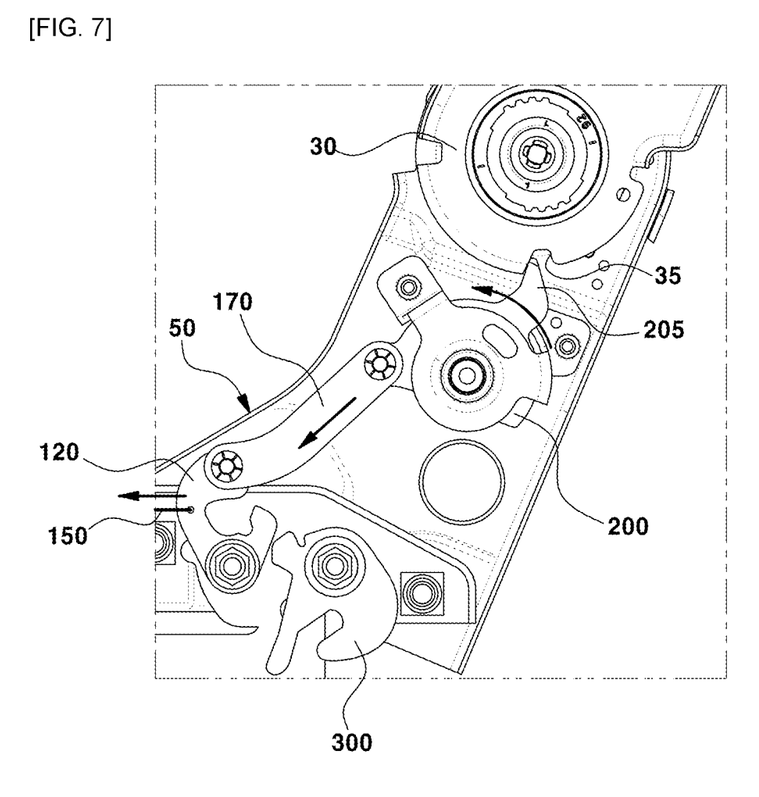
FIG. 7 is a view showing the modification of the vehicle seat adjustment device according to the embodiment of the present description before the walk-in operation is performed.

FIG. 7 is a view showing the modification of the vehicle seat adjustment device according to the embodiment of the present description before the walk-in operation is performed.

Referring to FIG. 7, when the walk-in operation of the seat is performed, the cable 150 may pull the cam 120, and the cam 120 may be rotated. When the cam 120 is rotated counterclockwise in the drawing, the locked state between the cam 120 and the tilting device 300 may be released. The tilting device 300 may be unlocked and rotated, and the tilting of the seat-cushion-tilting frame 50 may be performed.

As the cam 120 is rotated, the connection link 170 connected to one end of the cam 120 may be moved in a direction toward the cam 120. When the connection link 170 is moved in the direction toward the cam 120, the probe 200 may be rotated counterclockwise in the drawing. That is, during the walk-in operation of the seat, the cam 120 and the probe 200 may be rotated in the same direction. The stopper 205 may be inserted into the locking groove 35 by the rotation of the probe 200. When the stopper 205 is inserted into the locking groove 35, folding of the seatback frame 30 may be restricted.

Figure 8:
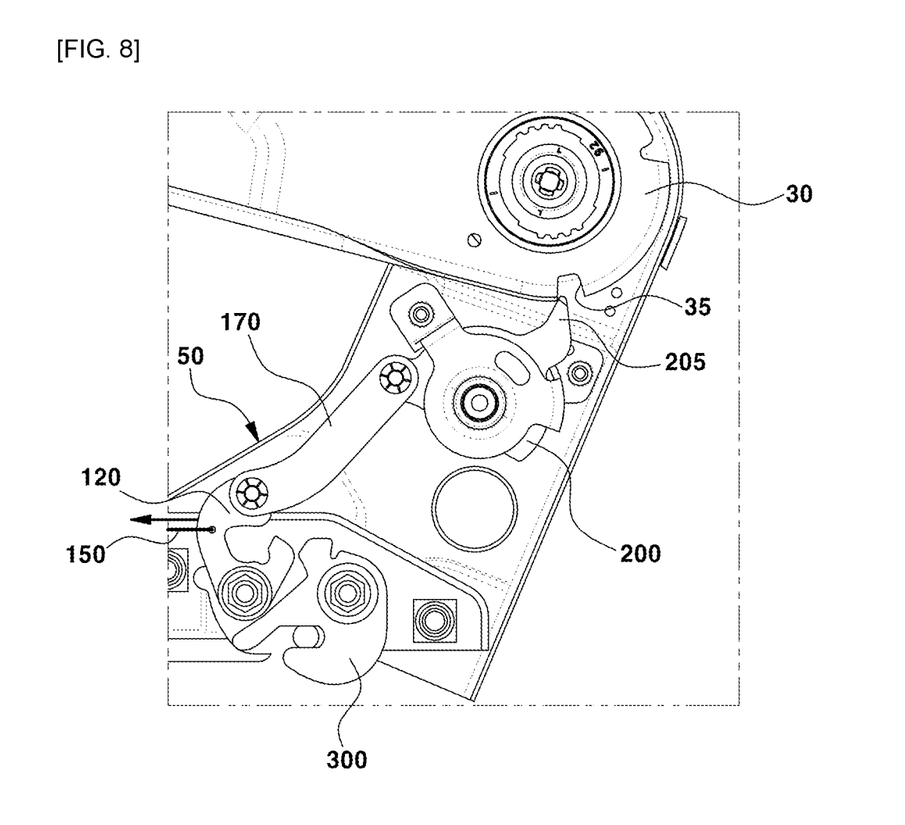
FIG. 8 is a view showing the modification of the vehicle seat adjustment device according to the embodiment of the present description after the walk-in operation is performed.

FIG. 8 is a view showing the modification of the vehicle seat adjustment device according to the embodiment of the present description after the walk-in operation is performed.

Referring to FIG. 8, when the walk-in operation of the seat is performed in the state in which the seatback frame is folded, the stopper 205 may be caught in the locking groove 35. Even if the stopper 205 is not completely inserted into the locking groove 35, the movement of the stopper 205 may be restricted by the locking groove 35. Accordingly, the probe 200 may not be rotated enough to perform the walk-in operation of the seat. For example, when movement of the stopper 205 is restricted by the locking groove 35, rotation of the probe 200 may also be restricted. In the state in which rotation of the probe 200 is restricted, even if the cam 120 is rotated by the operation of the actuator (not shown), movement of the connection link 170 connected to the probe 200 may be restricted. As a result, when rotation of the probe 200 is restricted, the movement of the connection link 170 is restricted, and as such, the locked state of the tilting device 300 may not be released.

Accordingly, even if a user presses the walk-in switch, the walk-in operation may not be performed in the state in which the seatback is folded.

In this specification, the rear end may be a portion adjacent to a portion at which the seat cushion and the seatback are connected to each other based on the direction in which the seat is disposed, and the front end may be a portion spaced apart from the portion at which the seatback and the seat cushion are connected to each other. In other words, the front end may be the other end opposite the one end of the seat cushion connected to the seatback.

As is apparent from the above description, the present description provides the following effects.

First, when a walk-in operation of a seat is performed, a stopper is inserted into a locking groove, and as such, folding of a seatback frame may be restricted. Accordingly, the walk-in operation of the seat and a folding operation of a seatback are restricted from being simultaneously performed, thereby making it possible to prevent damage to a frame due to unintended contact between the frames of the seat.

Second, when the walk-in operation of the seat is performed in the state in which the seatback is folded, the stopper is inserted into the locking groove, and as such, rotation of a probe may be restricted. When rotation of the probe is restricted, a locked state of a tilting device configured to perform the walk-in operation may not be released. Accordingly, the walk-in operation of the seat and the folding operation of the seatback are restricted from being simultaneously performed, thereby making it possible to prevent damage to a frame due to unintended contact between the frames of the seat.

The description has been described in detail with reference to preferred embodiments thereof. However, it will be appreciated by those skilled in the art that changes may be made in these embodiments without departing from the principles and spirit of the description, the scope of which is defined in the appended claims and equivalents thereto.

What is claimed is:

1. A vehicle seat adjustment device comprising:
   a seat-cushion-tilting frame disposed on a moving rail, the moving rail being coupled to a fixed rail so as to be movable forwards and backwards and connected to a seatback frame;
   a tilting device hingedly coupled to a base bracket disposed on the moving rail and to a rear end of the seat-cushion-tilting frame to perform forward tilting of the seat-cushion-tilting frame;
   a locking device connected to the tilting device to lock and unlock the tilting device; and
   a probe rotatably disposed between the seatback frame and the tilting device, the probe comprising a stopper capable of being inserted into a locking groove formed in the seatback frame,
   wherein rotation of the probe is restricted when the stopper is inserted into the locking groove.

2. The vehicle seat adjustment device of claim 1, wherein the tilting device comprises:
   a rear link configured to connect the base bracket, connected to a rear end of the moving rail, and the rear end of the seat-cushion-tilting frame, and
   a rear spring mounted in the rear link to provide elastic force to enable the rear link to stand up.

3. The vehicle seat adjustment device of claim 2, wherein the locking device comprises:
a detent comprising a second protrusion coupled to a first protrusion in the rear link and an extension part extending toward the probe, and
a cam configured to release a locked state between the detent and the tilting device, and
wherein the cam is connected to a cable of an actuator and is rotated by operation of pulling the cable.

4. The vehicle seat adjustment device of claim 3, wherein the cam comprises a first region connected to the cable and a second region configured to contact the detent by rotation of the cam.

5. The vehicle seat adjustment device of claim 3, wherein:
the detent is rotated by rotation of the cam to release a locked state between the first protrusion and the second protrusion, and
the extension part contact and rotates the probe so that the stopper is inserted into the locking groove.

6. The vehicle seat adjustment device of claim 5, wherein folding of the seatback frame is restricted when the stopper is inserted into the locking groove.

7. The vehicle seat adjustment device of claim 3, wherein:
the detent further comprises a projection part configured to contact one end of the cam during rotation of the cam, and
the projection part and the second protrusion are provided at one end of the detent with respect to an axis around which the detent rotates, and the extension part is provided at the other end of the detent opposite to the one end thereof with respect to the axis around which the detent rotates.

8. The vehicle seat adjustment device of claim 3, wherein the detent and the cam are disposed on the seat-cushion-tilting frame.

9. The vehicle seat adjustment device of claim 3, wherein:
the actuator rotates the cam in a direction in which the seatback frame is folded toward front of a seat cushion using the cable when a walk-in operation of a seat is performed, and the detent is rotated in a direction opposite the direction in which the cam is rotated.

10. The vehicle seat adjustment device of claim 9, wherein folding of the seatback frame is restricted when rotation of the detent is restricted.

11. The vehicle seat adjustment device of claim 9, wherein the probe is rotated in a direction opposite to the direction in which the detent is rotated when the detent is rotated.

12. The vehicle seat adjustment device of claim 1, wherein:
the stopper is caught in the locking groove and the rotation of the probe is restricted when a walk-in operation of a seat starts in a state in which the seatback frame is folded,
rotation of the detent is restricted when the rotation of the probe is restricted, and as such, release of a locked state of the tilting device is restricted so that performance of the walk-in operation of the seat is restricted.

13. The vehicle seat adjustment device of claim 1, wherein the stopper of the probe is spaced apart from the locking groove in a locked state of the tilting device.

14. The vehicle seat adjustment device of claim 1, wherein the locking device comprises:
a connection link connected to the probe, and
a cam connected to the connection link to release a locked state of the tilting device, and
wherein the cam is connected to a cable of an actuator and is rotated by operation of pulling the cable.

15. The vehicle seat adjustment device of claim 14, wherein:
one end of the cam contacts the tilting device, and the other end of the cam is connected to the connection link, and
the locked state of the tilting device is released when the cam is rotated, and the probe is rotated in a direction in which the cam rotates by the connection link connected to the cam.

16. The vehicle seat adjustment device of claim 15, wherein:
the stopper is inserted into the locking groove when the probe is rotated in the direction in which the cam rotates, and
folding of the seatback frame is restricted when the stopper is inserted into the locking groove.

17. The vehicle seat adjustment device of claim 1, wherein the stopper extends in a radial direction with respect to an axis around which the probe rotates.

* * * * *